Dec. 8, 1970  J. E. HADLEY  3,545,839
REFLECTOR FOR LANDING STRIPS, DRIVEWAYS, OR THE LIKE
Filed Aug. 1, 1968
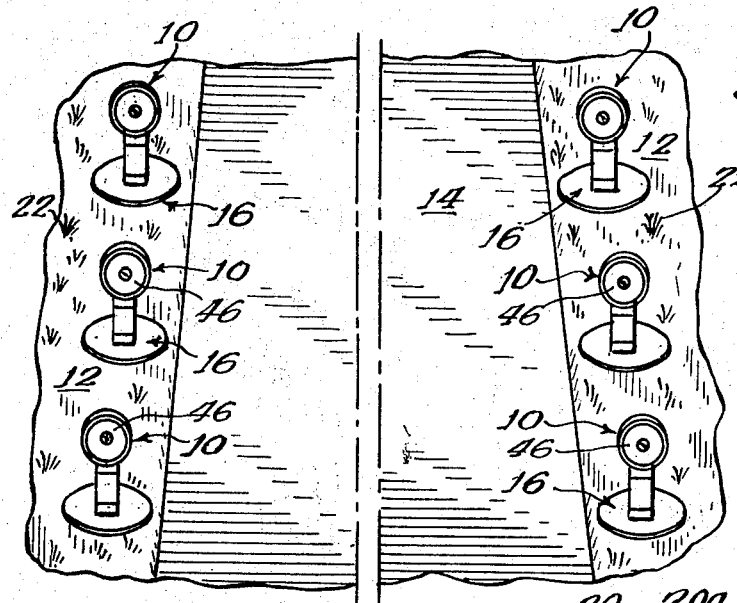
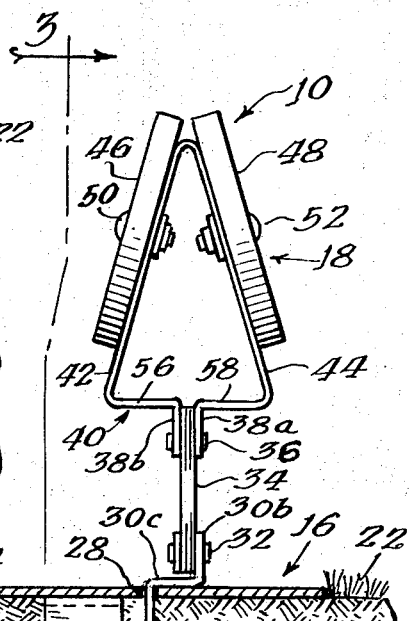
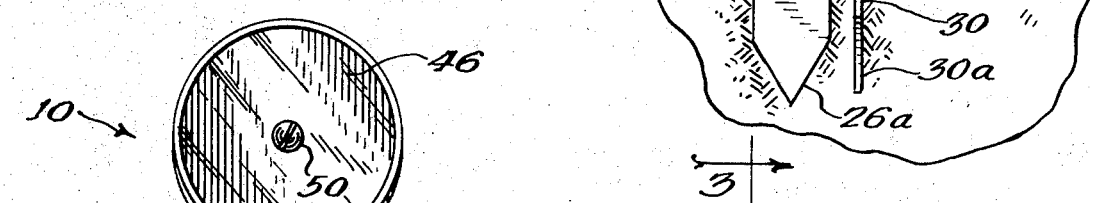
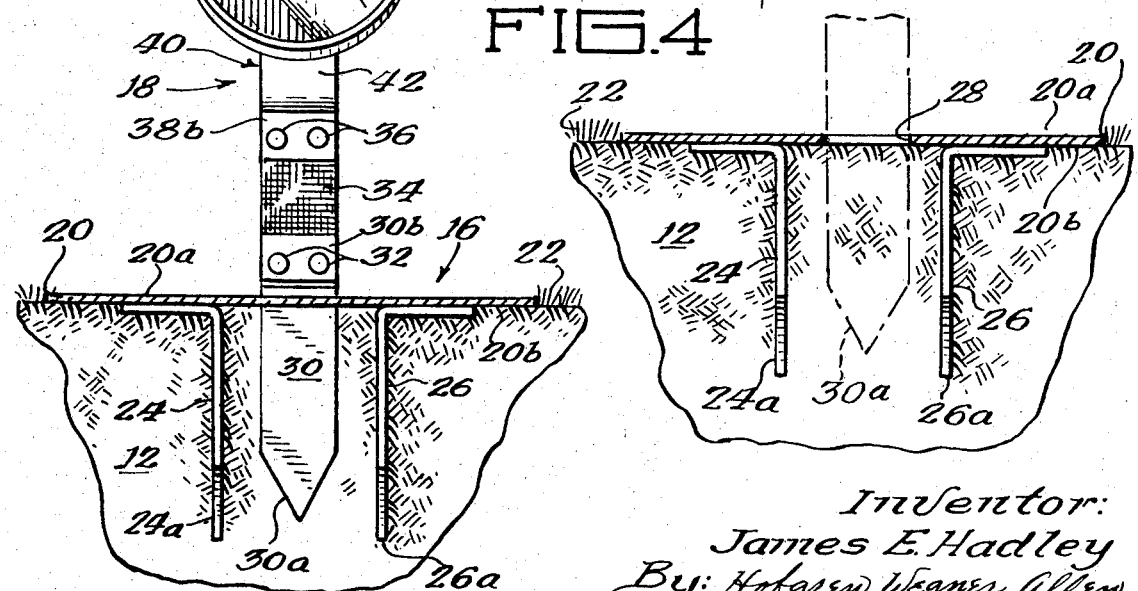
Inventor:
James E. Hadley
By: Hofgren, Wegner, Allen,
Stellman & McCord
Attorneys United States Patent Office 3,545,839
Patented Dec. 8, 1970

3,545,839
REFLECTOR FOR LANDING STRIPS, DRIVEWAYS, OR THE LIKE
James E. Hadley, Wichita, Kans., assignor to Miro-Flex Company, Inc.
Filed Aug. 1, 1968, Ser. No. 749,495
Int. Cl. G02b 5/12
U.S. Cl. 350—97                                6 Claims

ABSTRACT OF THE DISCLOSURE

A reflector assembly for use alongside vehicle lanes, such as runways, driveways or the like, and characterized in that the assembly includes a marker element which remains in position during mowing or other maintenance work, and a removable reflector element having a column flexible in only one plane, with two reflectors supported on the column in an upwardly converging back-to-back relationship so they are tilted for optimum reflection of vehicle lights.

BACKGROUND OF THE INVENTION

The prior art representative of reflector structures which are intended to be staked into the ground, alongside a vehicle lane includes the patents to Gunderson 3,066,577, Imparato 3,067,717, Isenberg 2,610,548, McGrath 2,675,-739, Blanchard 2,542,894, Joyce 2,109,011, Menachof 2,155,992, Kimbrough 1,600,887 and Daniels 343,365. In some of these patents, the reflector structure has two reflecting faces, as for example in the Gunderson Pat. 3,066,-577 and Blanchard 2,542,894. In all of the patents the reflector is provided with a stake which is inserted in the ground for anchoring the reflector alongside a vehicle lane.

Some of the reflectors, such as those shown in the Imparato Pat. 3,067,717 and Gunderson Pat. 3,066,577, are mounted on flexible stems which are yieldable in an infinite number of planes.

A major disadvantage of the reflectors shown in the prior art is that, when it is necessary to mow grass adjacent a vehicle lane the reflector must be removed to permit the mower to traverse the area occupied by the reflector. Subsequently, the reflector stake must be reinserted in the ground, and generally the relocation of the reflector following this operation has been by chance rather than with any predetermined accuracy. In addition, a reflector mounted on a stem which is yieldable in an infinite number of planes may assume a position in which its angle with respect to the center line of the vehicle lane precludes adequate reflection from the lights of a vehicle using the lane.

Furthermore, those reflector structures having forwardly and rearwardly facing reflector members are constructed so that the reflector surfaces lie in a vertical plane. In view of the fact that the reflectors are close to the ground the reflector surfaces fail to provide optimum reflection from vehicle lights which are much farther off the ground than are the reflectors, and are tilted downwardly toward the ground.

Thus, it has become desirable to provide a reflector assembly for use alongside vehicle lanes which obviates the shortcomings of the reflectors previously known in the art. As used herein "vehicle lane" means any defined ground path followed by aircraft, automobiles, or the like.

SUMMARY OF THE INVENTION

This invention is directed, in brief, to the provision of an improved reflector assembly for use alongside vehicle lanes. The best mode currently contemplated for carrying out the invention comprises a reflector element having a column yieldable in only one plane with two reflective surfaces mounted at the top of the column in a back to back and upwardly converging relationship relative to each other on the column. In use, the reflector element is combined with a thin disc-like ground engaging marker element by means of a stake and slot arrangement. This allows removal of the reflector element from the ground adjacent the driveway, runway or the like, while retaining a permanent position marker to permit mowing of the ground around the reflector location and accurate replacement of the reflector element.

BRIEF DESCRIPTION OF THE DRAWINGS

FIG. 1 is a fragmentary broken perspective view of a portion of a vehicle lane and adjacent ground surface, showing a plurality of the reflector assemblies of this invention mounted alongside the lane;

FIG. 2 is a fragmentary enlarged side view, partially in section, showing the mounting of a reflector assembly of this invention in the ground;

FIG. 3 is a section view taken generally along the lines 3—3 of FIG. 2 and being substantially a front elevational view of the reflector assembly of this invention; and FIG. 4 is a fragmentary enlarged view of a portion of FIG. 3 showing the relationship of the marker element of the reflector assembly when the reflector element has been removed therefrom to permit mowing or other maintenance work.

DESCRIPTION OF THE PREFERRED EMBODIMENT

Referring to the drawings, a plurality of reflector assemblies 10 of this invention are shown in use embedded in ground 12 alongside a vehicle lane 14. Each reflector assembly 10 includes a marker element generally designated 16 and a reflector element generally designated 18.

The marker element 16 includes a thin, disc-like base member 20 which may be metal, plastic, or other rigid or semi-rigid material, and which has a substantially flat top 20a and flat bottom 20b.

Marker element 16 includes ground engaging means in the form of a pair of parallel, rigid stakes 24 and 26 which depend from the underside 20b of base 20 and have pointed ends 24a and 26a, respectively. Preferably the stakes are of an inverted L-shape for easy welding or riveting to the base member 20. Base 20 of marker element 16 is provided with an opening, such as the narrow slot 28, for a purpose to be explained. Slot 28 is spaced from stakes 24 and 26, and conveniently may extend transversely of the base relative to the stakes. When marker stakes are embedded in the ground the marker base 20 is thin enough that it need not be removed for mowing the grass, since a mower may traverse it without having the blades strike it; and when "thin base" is used in the claims it means a base thin enough for this purpose.

The reflector element 18 includes a stake 30 which has an elongated pointed shank 30a and an upstanding arm 30b which are in parallel planes, and a transverse portion 30c connecting shank 30a and arm 30b. Secured to upstanding arm 30b of the stake 30 by fastening means such as rivets 32 is a flexible or yieldable reflector supporting column 34 which is preferably formed of a short, wide piece of heavy, flexible rubberized fabric so as to be yieldable in only one plane.

The upper end of reflector supporting column 34 is connected by fastening means such as rivets 36 to downwardly extending flanges 38a and 38b of opposed free ends of a generally triangular reflector supporting bracket 40. In the illustrated embodiment, bracket 40 is a metal member bent upon itself to provide two upwardly converging legs 42 and 44, which support reflector members 46 and 48, respectively. Fastening means such as bolts 50 and 52 extend through the respective reflector members 46 and 48, and through the respective legs 42 and 44 to secure the reflector members to the bracket 40. In this fashion, two reflector members are mounted on the reflector element in upwardly converging back-to-back relationship, so that each reflector member faces upwardly as well as forwardly. In the preferred embodiment, each of the legs 42 and 44 forms an angle of about 70° to the horizontal, so that the reflective surface of each reflector member is at about a 20° angle rearward of the vertical.

In use, a series of marker elements 16 are staked at desired intervals along the vehicle lane 14 with their slots 28 at a desired predetermined angle (usually normal) to the center line of the lane. In this operation, the slot 28 assists in determining the proper orientation of the base 20 relative to the vehicle lane 14, because strings may be stretched across the lane normal to its center line at desired intervals, and each marker element 16 may be oriented by positioning its slot 28 directly on, and lengthwise of one of the strings. A dark mark on the string, visible through the slot, may indicate the correct distance from the center line of the lane 14.

The reflector elements 18 are then positioned by thrusting the stakes 30 through the slots 28 until the transversely off-set portions 30c of the stakes 30 abut the tops 20a of bases 20. Thereafter, the reflector elements 18 may be removed at any time to permit maintenance work on or around the vehicle lane 14, and may be accurately returned to their precise predetermined locations by reinserting stakes 30 through slots 28 of bases 20. Thus slot 28 and stake 30 comprise means for removably assembling reflector elements 18 with marker elements 16. With the slots 38 normal to the center line of pavement 14, column 34 is yieldable only lengthwise of the lane 14; so that even if the reflector element is struck so as to bend the column the reflector members remain normal to the pavement center line and thus afford adequate reflection of vehicle lights.

Finally, the particular relationship of the two reflector members 46 and 48 affords optimum reflection from the headlights of vehicles using the lane, because the reflector members are tilted slightly upwardly toward the level of the lights of vehicles using the lane, and substantially directly opposed to the downward inclination of the beam from such lights.

The foregoing detailed description has been given for clearness of understanding only, and no unnecessary limitations should be understood therefrom, as some modifications may be obvious to those skilled in the art.

I claim:

1. A reflector assembly for use alongside vehicle lanes comprising, in combination:
a marker element in the form of a planar section of substantially rigid, thin sheet material having a small maximum thickness such that when positioned on the ground the blades of a mower may clear the marker element, stake means for firmly staking the marker element to the ground, and an opening in the marker element which may be oriented at a predetermined angle with reference to a vehicle lane;
and a reflector element including a support the lower end portion of which provides stake means adapted to impale the oriented opening and fitting said opening so as to orient the reflector element at a predetermined angle with reference to a vericle lane, said support adjacent said lower end having shoulder means which abuts the top of the marker element to fix the support in an upright position and projecting a predetermined distance above the marker element, and a reflector member on the support, whereby the marker element may be permanently secured to the ground and the reflector element may be removed for ground maintenance and may be accurately relocated alongside the vehicle lane by re-assembling it with the marker element.

2. The reflector assembly of claim 1 in which the shoulder means on the support comprises a laterally offset portion of the support.

3. The reflector assembly of claim 1 in which the reflector element includes a triangular reflector member supporting bracket surmounting the support, said bracket having a pair of adjacent upright fastening legs at its lower end laterally projecting coplanar arms at the top of the fastening legs, and converging support legs connected at the upper ends; and a reflector member secured to each of the converging legs, said reflector being in back to back relationship.

4. The reflector assembly of claim 1 in which the reflector element has two reflector members mounted in an upwardly converging back-to-back relationship on the reflector support.

5. The reflector assembly of claim 4 in which the reflector support includes a portion which is flexible in only one plane.

6. The reflector assembly of claim 1 in which the reflector support includes a short piece of stiffly resilient material which is flexible in only one plane.

References Cited

UNITED STATES PATENTS

| 181,826 | 9/1876 | Eanes | 248—156 |
| 2,050,779 | 8/1936 | Blanchard | 350—107 |
| 1,600,887 | 9/1926 | Kimbrough | 350—97 |
| 2,094,741 | 10/1937 | Grussendorf et al. | 350—101X |
| 2,542,894 | 2/1951 | Blanchard | 350—97UX |

FOREIGN PATENTS

| 362,817 | 8/1962 | Switzerland | 248—156 |
| 1,198,846 | 8/1965 | Germany | 248—156 |

PAUL R. GILLIAM, Primary Examiner

U.S. Cl. X.R.

248—156; 350—100